US005607063A

United States Patent [19]

Nishijima et al.

[11] Patent Number: 5,607,063

[45] Date of Patent: Mar. 4, 1997

[54] PAPER OBJECT SORTING APPARATUS HAVING MEANS FOR ERASING BAR CODES PRINTED ON PAPER OBJECT AND PAPER SORTING METHOD USING SAID APPARATUS

[75] Inventors: Yasuo Nishijima; Kunio Hiromori; Toshiharu Kubota, all of Tokyo, Japan

[73] Assignee: NEC Corporation, Tokyo, Japan

[21] Appl. No.: 300,998

[22] Filed: Sep. 6, 1994

[30] Foreign Application Priority Data

Sep. 6, 1993 [JP] Japan .................................... 5-220760

[51] Int. Cl.[6] ....................................... G06K 9/00

[52] U.S. Cl. ....................................... 209/584

[58] Field of Search .................... 209/3.3, 3.2, 569, 209/583, 584, 546, 900

[56] References Cited

U.S. PATENT DOCUMENTS

| | | | |
|---|---|---|---|
| 4,587,411 | 5/1986 | Obstfelder et al. | 235/437 |
| 4,632,252 | 12/1986 | Haruki et al. | 209/546 |
| 4,641,753 | 2/1987 | Tamada | 209/546 |
| 4,757,189 | 7/1988 | Daboub | 235/462 |
| 4,992,649 | 2/1991 | Mampe et al. | 235/462 |
| 5,042,667 | 8/1991 | Keough | 209/569 |
| 5,177,368 | 1/1993 | Kay | 250/566 |
| 5,206,490 | 4/1993 | Petigrew et al. | 235/462 |
| 5,249,687 | 10/1993 | Rosenbaum et al. | 209/3.3 |
| 5,431,288 | 7/1995 | Nishijima et al. | 209/584 |

FOREIGN PATENT DOCUMENTS

| | | |
|---|---|---|
| 2683929 | 5/1993 | France . |
| 57-110379 | 7/1982 | Japan . |
| 2092957 | 8/1982 | United Kingdom . |

*Primary Examiner*—William E. Terrell
*Assistant Examiner*—T. Kelly
*Attorney, Agent, or Firm*—Foley & Lardner

[57] ABSTRACT

Information indicating whether or not the current sorting operation is the final one is preset in a control section. Then, a bar code reader recognizes sorting information of paper objects by reading respective bar codes printed on the paper objects that are supplied one by one from a paper object supply section. A bar code erasing section erases the bar codes after the bar codes have been read, if the information indicating the current sorting operation is the final one is preset in the control section. If the current sorting operation is not the final one, the bar codes are not erased. The paper objects are sorted based on the sorting information recognized by the bar code reader, and stacked in stores. Being capable of erasing the bar codes printed on the paper objects before they are distributed to users, a paper object sorting apparatus of the present invention has an advantage that it is free from a possibility of giving the users uncomfortable feeling. Further, since the bar codes can be printed on the paper objects with a substance that can be checked by the naked eye, it is possible to check the printing quality of the bar codes.

22 Claims, 11 Drawing Sheets

PAPER OBJECT SORTING APPARATUS HAVING MEANS FOR ERASING BAR CODES PRINTED ON PAPER OBJECT AND PAPER SORTING METHOD USING SAID APPARATUS

BACKGROUND OF THE INVENTION

1. Field of the Invention

The present invention relates to a paper object sorting apparatus which converts address information written on paper objects or like objects (hereinafter referred to as "paper objects") to, for instance, bar codes, prints the bar codes on the respective paper objects, and then reads the bar code to thereby sort-and-stack paper objects in accordance with the address information indicated by the bar codes.

2. Description of the Related Art

Conventional paper object sorting apparatuses print bar codes corresponding to address information written on paper objects, recognize the address information by reading the respective bar codes, and sort-and-stack the paper objects in accordance with the recognized address information. These paper object sorting apparatuses have greatly improved the operation efficiency because the conversion from address information to bar codes eliminates the need of performing optical character recognition on address information etc. in every paper object sorting operation. A paper object sorting apparatus of the above prior art is disclosed in the Gazette of Patent Disclosure No. 1982-110379 (disclosed on Jul. 9, 1982).

The paper object sorting apparatus disclosed in the Gazette will be described below with reference to FIG. 1.

Paper objects 108 which have not been sorted-and-stacked before are set in a paper object supply section 101. The paper objects 108 are supplied to a conveying path 109. While the paper objects 108 are transported on the conveying path 109, an optical character recognizing section 102 recognizes postal codes, addresses and other information (hereinafter referred to as "address information") written on the paper objects 108 based on image data obtained by scanning the surfaces of the paper objects 108. A bar code printing section 103 converts the address information recognized by the optical character recognizing section 102 to bar codes, and prints the bar codes onto the respective paper objects 108. Only in the first sorting operation, a gate controller 105 is controlled in accordance with the address information recognized by the optical character recognizing section 102. The conveying direction of the paper objects 108 is branched by gates 106 that are driven by the gate controller 105. Thus, the paper objects 108 are sorted-and-stacked in stores 107 in accordance with the address information.

In second and subsequent sorting operations, bar-codes-printed paper objects 108 set in the paper object supply section 101 are supplied to the conveying path 109. While the paper objects 108 are transported on the conveying path 109, the bar codes printed on the paper objects 108 are read by a bar code reader 104 to recognize the corresponding address information. Then, as in the case of the first sorting operation, the paper objects 108 are sorted-and-stacked in the stores 107 in accordance with the address information recognized by the bar code reader 104. This operation is repeated until the sorting is completed.

As described above, by converting the address information recognized by the optical character recognizing section such as an OCR to bar codes and printing the bar codes onto the paper objects when sorting those for the first time, the address information can be recognized simply by reading the bar codes on the paper objects in the subsequent sorting operations.

However, when the conventional paper object sorting apparatus is used, bar codes remain printed on paper objects. Therefore, the user who receive paper objects bearing dirt etc. caused by a bar code will feel very uncomfortable.

SUMMARY OF THE INVENTION

An object of the present invention is to provide a paper object sorting apparatus which can improve the efficiency of a paper object sorting operation by converting sorting information written on the paper objects to bar codes and printing the bar codes onto the paper objects, and which solves a problem that a bar code remaining on the paper objects after the sorting gives an unpleasant feeling to the user who receive it.

Another object of the invention is to provide a paper object sorting apparatus which enables checking of the printing quality of bar codes by making it possible to check, by the naked eye, the bar codes printed on the paper objects.

To attain the above objects, a paper object sorting apparatus according to the present invention comprises a paper object supply section for supplying, one by one, a plurality of paper objects on each of which a bar code corresponding to information added to the paper objects to be used for sorting the paper objects is printed, a bar code reader for reading the bar codes printed on the respective paper objects supplied from the paper object supply section, a bar code erasing section for erasing the bar codes after they have been read by the bar code reader, a sorting section for sorting the paper objects based on recognition results of the bar code reader, and stackers for stacking the paper objects sorted by the sorting section.

In operation, first, the bar code reader recognizes the sorting information of the paper objects by reading the bar codes printed on the respective paper objects supplied one by one from the paper object supply section. Then the bar codes are erased at the bar code erase section after they have been read. Finally, the paper objects are sorted based on the sorting information recognized by the bar code reader, and stacked in the stackers.

Being capable of erasing the bar codes printed on the paper objects before they are distributed to users, the paper object sorting apparatus of the present invention has an advantage that it is free from a possibility of giving the users an uncomfortable feeling.

Further, since the bar codes can be printed on the paper objects with a substance that can be checked by the naked eye, it is possible to check the printing quality of the bar codes. This will greatly improve the efficiency and accuracy of the sorting operation.

BRIEF DESCRIPTION OF THE DRAWINGS

The present invention will be described in further detail with reference to the accompanying drawings, in which.

DESCRIPTION OF THE PREFERRED EMBODIMENTS

A first embodiment of the present invention will be described in detail with reference to FIGS. 2 and 3.

Figure 2:
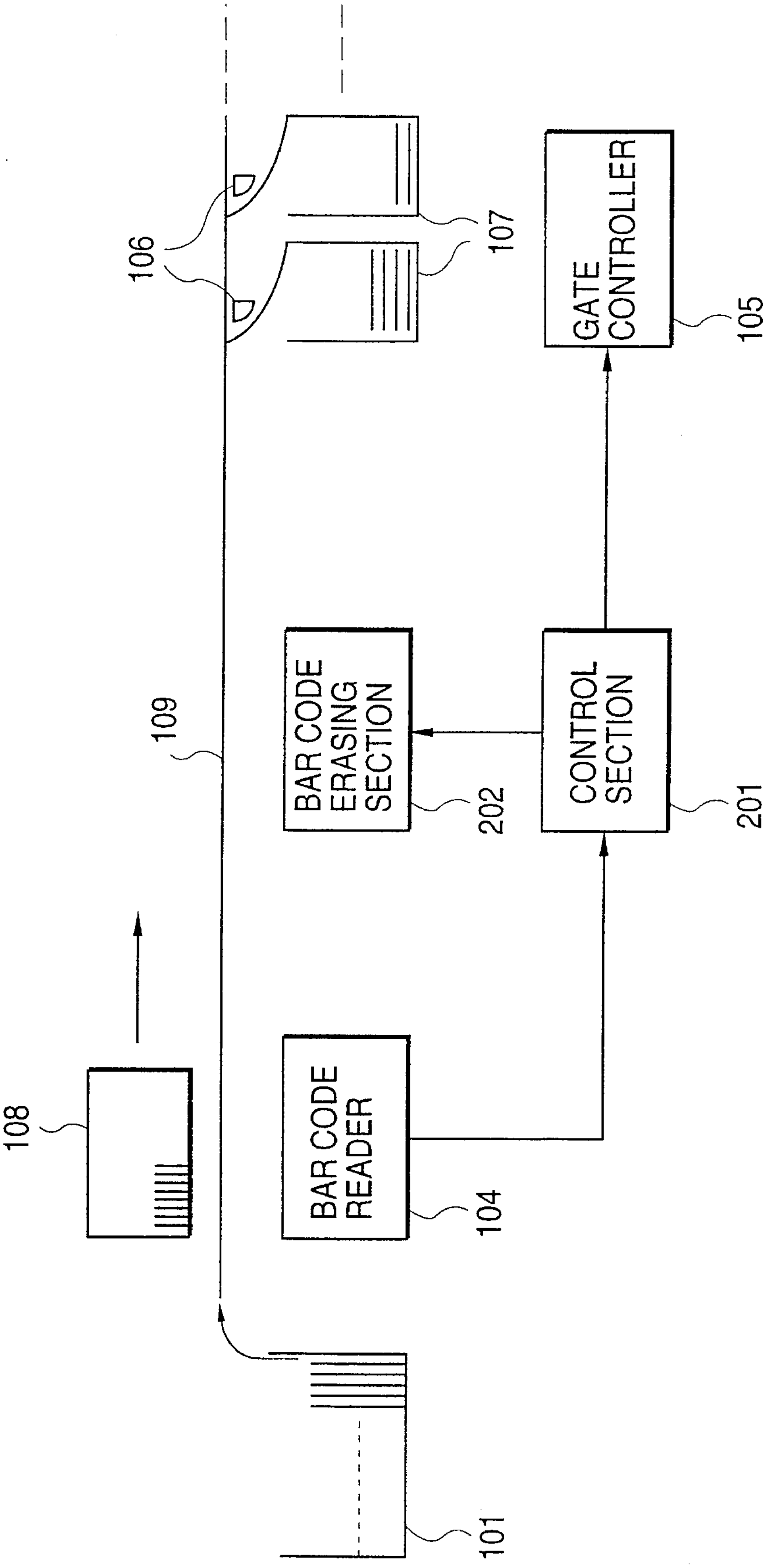
FIG. 2 is a schematic diagram showing a general configuration of a first embodiment of the present invention.
Figure 3:
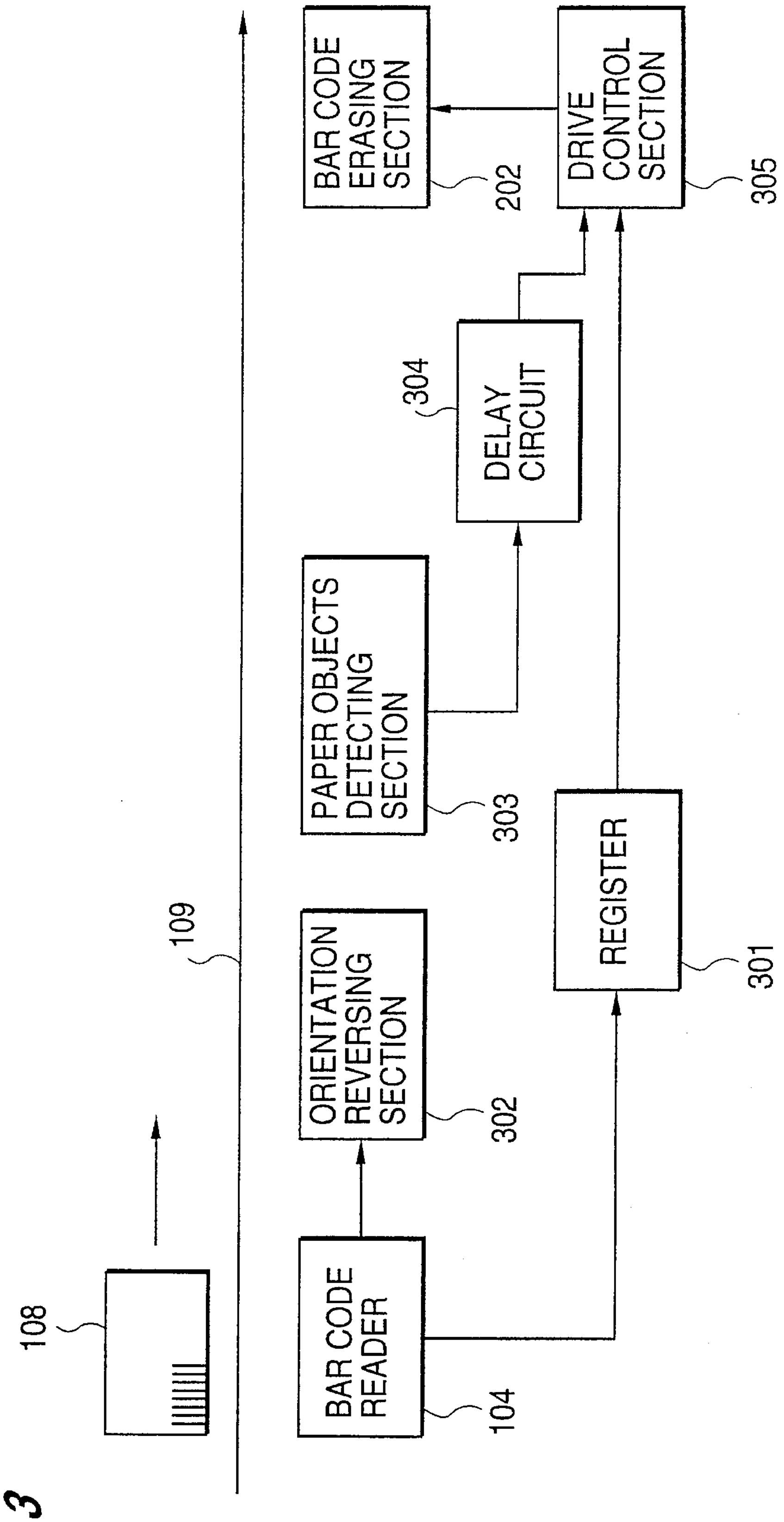
FIG. 3 is a schematic diagram showing a general configuration of the main part of the first embodiment of the present invention.

In a paper object sorting apparatus according to the first embodiment shown in FIG. 2, a plurality of paper objects 108 on which bar codes have already been printed are set in a paper object supply section 101. The paper object supply section 101 feeds the paper objects 108 one by one to a conveying path 109. A bar code reader 104 reads the bar code of the respective paper objects 108 fed from the paper object supply section 101, and recognizes the address information corresponding to the bar code thus read. The address information indicates a postal code, an address and other information written on the paper objects. A control section 201 judges whether or not the current paper object sorting operation is the final one. To this end, information indicating whether the current sorting operation is the final one is preset in the control section 201 before performing the sorting operation. If the current sorting operation is the final one, the control section 201 drives a bar code erasing section 202, and controls a gate controller 105 based on the address information recognized by the bar code reader 104. On the other hand, if the current sorting operation is not the final one, the control section 201 controls the gate controller 105 based on the address information recognized by the bar code reader 104 without driving the bar code erasing section 202. Receiving a drive signal output from the control section 201, the bar code erasing section 202 erases the bar codes on the paper objects. The gate controller 105 controls a gate 106 that is provided for each of a plurality of stores 107 based on a control signal produced by the control section 201. The conveying direction of the paper objects 108 is branched by driving those gates 106. Thus, the paper objects 108 are sorted-and-stacked in desired stores 107 in accordance with the address information recognized by the bar code reader 104.

A description will be made of a configuration for driving the bar code erasing section 202. Referring to FIG. 3, printing position information of a bar code on paper objects 108 read by the bar code reader 104 is stored in a register 301. If necessary, an orientation reversing section 302 reverses the orientation of the paper objects 108 depending on the surface on which the bar code read by the bar code reader 104 is printed. A paper object detecting section 303 supplies a detection signal to a delay circuit 304 when the tip of the paper objects being transported is detected. The delay circuit 304 delays the detection signal sent from the paper object detecting section 303 by a prescribed time that depends on the transport speed of the paper objects 108, and supplies the delayed signal to a drive control section 305. That is, the delay circuit 304 delays the detection signal sent from the paper object detecting section 303 by the time that is taken by the paper objects 108 to move from the paper object detection section 303 to the bar code erasing section 202. The drive control section 305 reads out the printing position information from the register 301 at the timing of receiving the signal from the delay circuit 304. Then, the drive control section 305 precisely detects the bar code printed position on the paper objects 108 based on the printing position information read from the register 301 and the timing of receiving the signal from the delay circuit 304. Then, the drive control circuit 305 drives the bar code erasing section 202 so as to erase the detected bar code.

Figure 4:
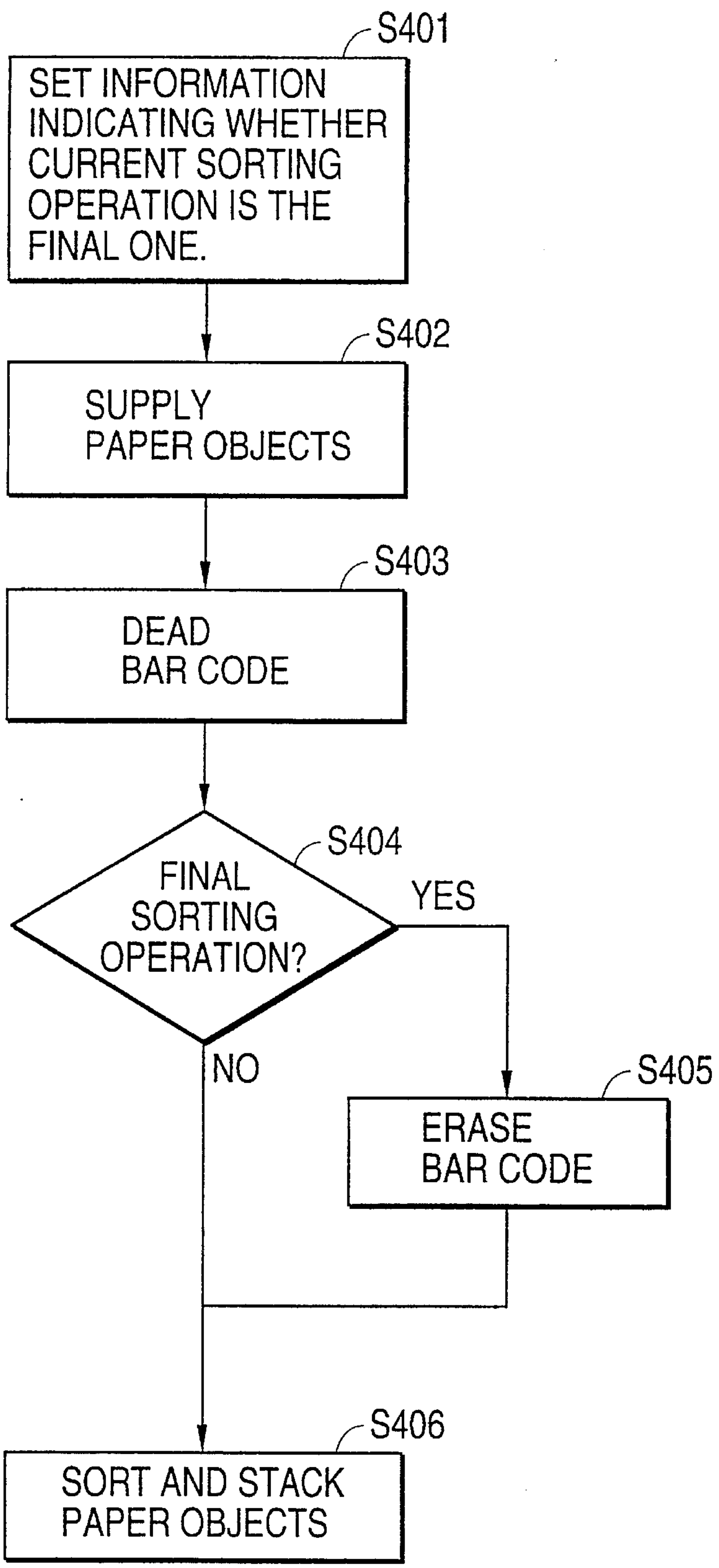
FIG. 4 is a flowchart showing a procedure of a paper object sorting method according to the first embodiment.

Next, a paper object sorting method using the paper object sorting apparatus of the first embodiment will be described with reference to FIGS. 2 and 4.

First, information indicating whether or not the current sorting operation is the final one is preset in the control section (S401). The final sorting operation is an operation after completion of which the sorted paper objects will be distributed to users. Then, the paper objects 108 on each of which a bar code corresponding to address information such as a postal code and an address are set in the paper object supply section 101. And the paper objects 108 are fed one by one from the supply section 101 to the conveying path 109 (S402). The bar code reader 104 reads the bar code printed on the paper objects 108 being transported, and recognizes the address information corresponding to the bar code thus read (S403). Then, the control section 201 judges whether or not the current operation of sorting the paper objects 108 is the final one (S404).

Where the control section 201 has judged that the current sorting operation is not the final one, the paper objects 108 are sorted-and-stacked in the desired store 107 in accordance with the address information recognized by the bar code reader 104 (S406).

Where the control section 201 has judged that the current sorting operation is the final one, the bar code erasing section 202 erases the bar code on the paper objects 108 (S405). Further, the paper objects 108 are sorted-and-stacked in the desired store 107 in accordance with the address information recognized by the bar code reader 104 (S406).

In the above manner, the bar codes on the paper objects are erased in the final sorting operation before they are distributed to users. Since no bar codes are printed on the paper objects to be delivered to users, it can be avoided that a bar code gives unpleasant feeling 10 to a user. Furthermore, since the bar codes on the paper objects are erased finally, the apparatus may be adapted to enable checking of the bar codes by the naked eye during the sorting operation. By enabling the checking of the existence of a bar code by the naked eye during the sorting operation, the printing quality of the bar code can be checked easily. This will greatly improve the efficiency and accuracy of the sorting operation.

Figure 5:
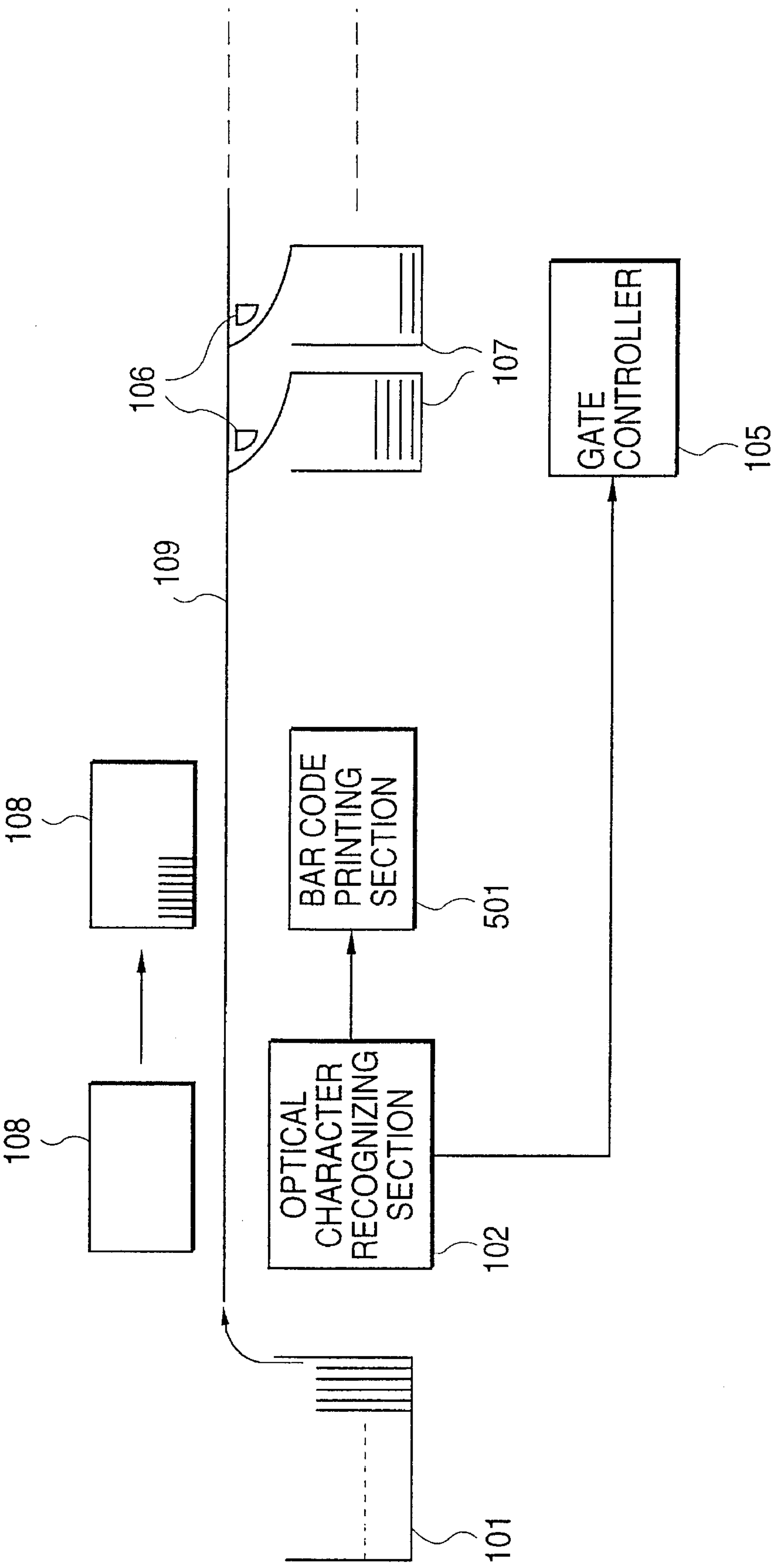
FIG. 5 is a schematic diagram showing a general configuration of a paper object sorting apparatus having a means for printing bar codes on paper objects.

The above embodiment is directed to the apparatus for sorting paper objects on which bar codes have already been printed. Referring to FIG. 5, a description will be made of a paper object sorting apparatus having a means for printing bar codes on the paper objects.

The paper objects 108 on which no bar codes have been printed are set in a paper object supply section 101, and then fed one by one from the paper object supply section 101 to a conveying path 109. An optical character recognizing section 102 recognizes address information written on the paper objects 108 based on image data obtained by scanning the paper objects 108 being transported. A bar code printing section 501 converts recognition results of the optical character recognizing section 102 to corresponding bar codes, and prints the bar codes onto the paper objects 108. Then, the paper objects 108 are sorted-and-stacked in desired stores 107 with a gate controller 105 controlled based on the recognition results of the optical character recognizing section 102.

As a result, the bar codes corresponding to the address information are printed on the paper objects 108 sorted-and-stacked in the stores 107. As described later, the bar codes printed by the bar code printing section 501 are ones that can be erased by the bar code erasing section 202 shown in FIG. 2.

Figure 1:
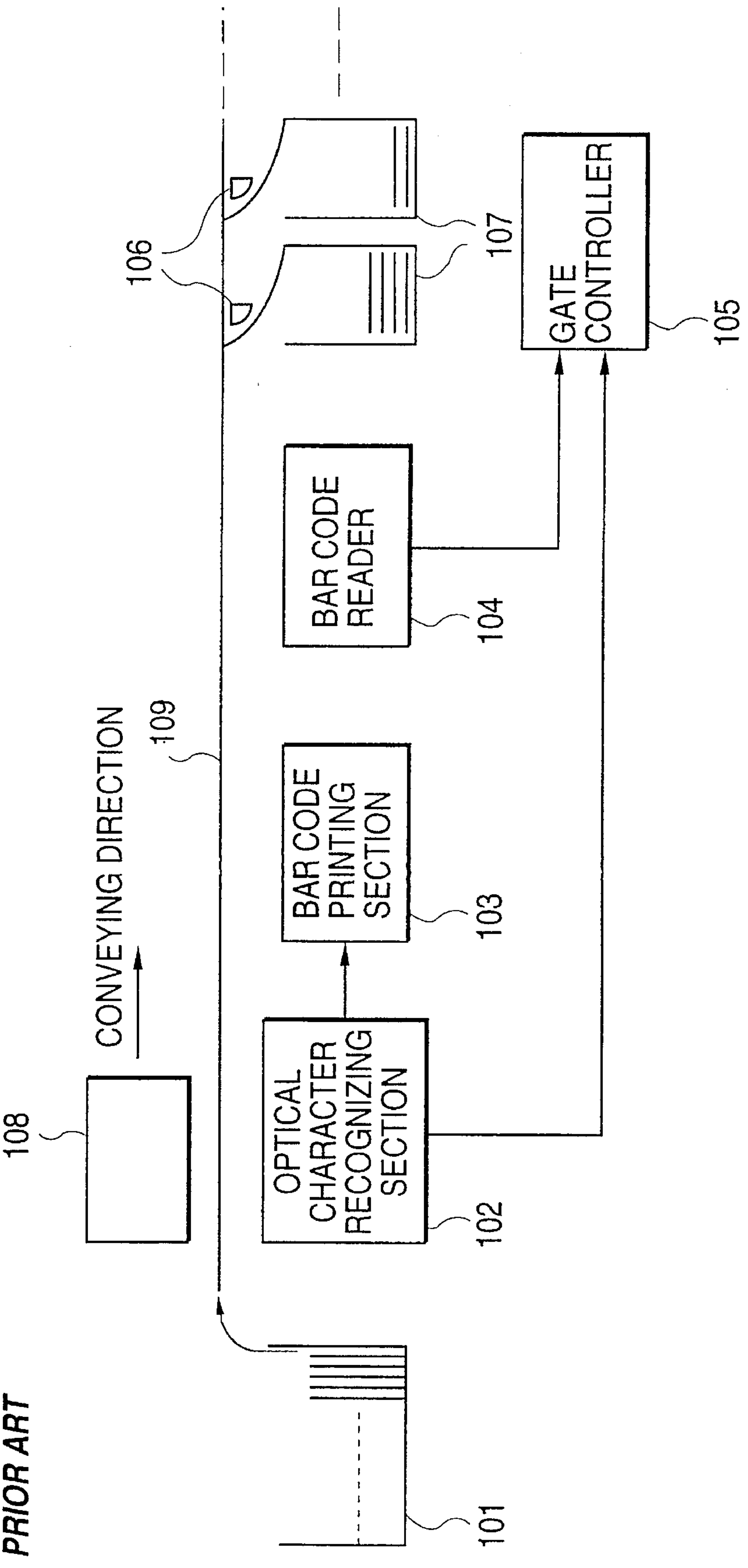
FIG. 1 PRIOR ART
FIG. 1 is a schematic diagram showing a general configuration of a paper object sorting apparatus of the prior art.
Figure 6:
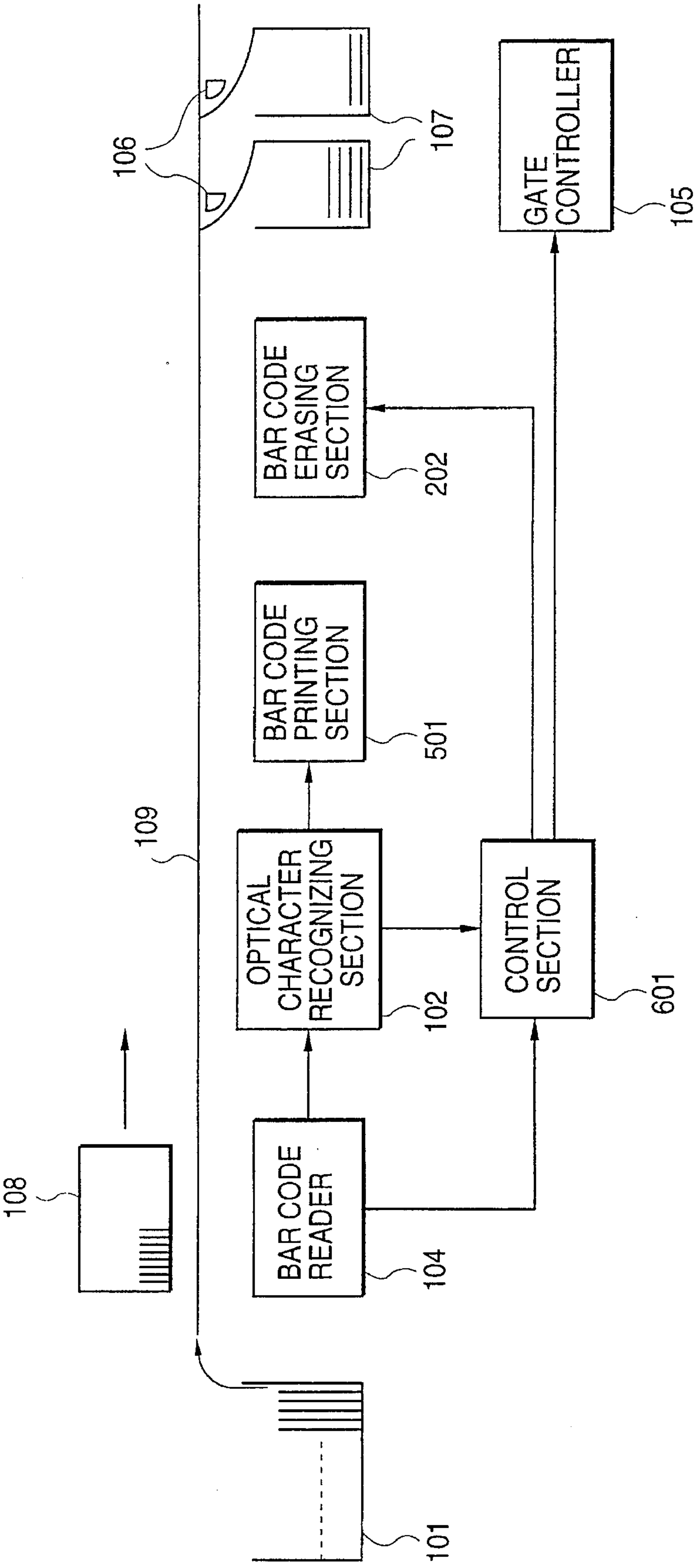
FIG. 6 is a schematic diagram showing a general configuration of a paper object sorting apparatus according to a second embodiment of the present invention.

Referring to FIG. 6, a second embodiment of the invention will be described. Since the components of the second embodiment other than a control section 601 are similar to those shown in FIGS. 1, 2 or 5, redundant descriptions therefor will be omitted.

Where bar codes are printed on the paper objects 108, the control section 601 controls the gate controller 105 in accordance with address information recognized by the bar code reader 104. Where no bar codes are printed on the paper objects 108, the control section 105 controls the gate controller 105 in accordance with address information recognized by the optical character recognizing section 102. Further, in the final sorting operation, the control section 105 drives the bar code erasing section 202.

Figure 7:
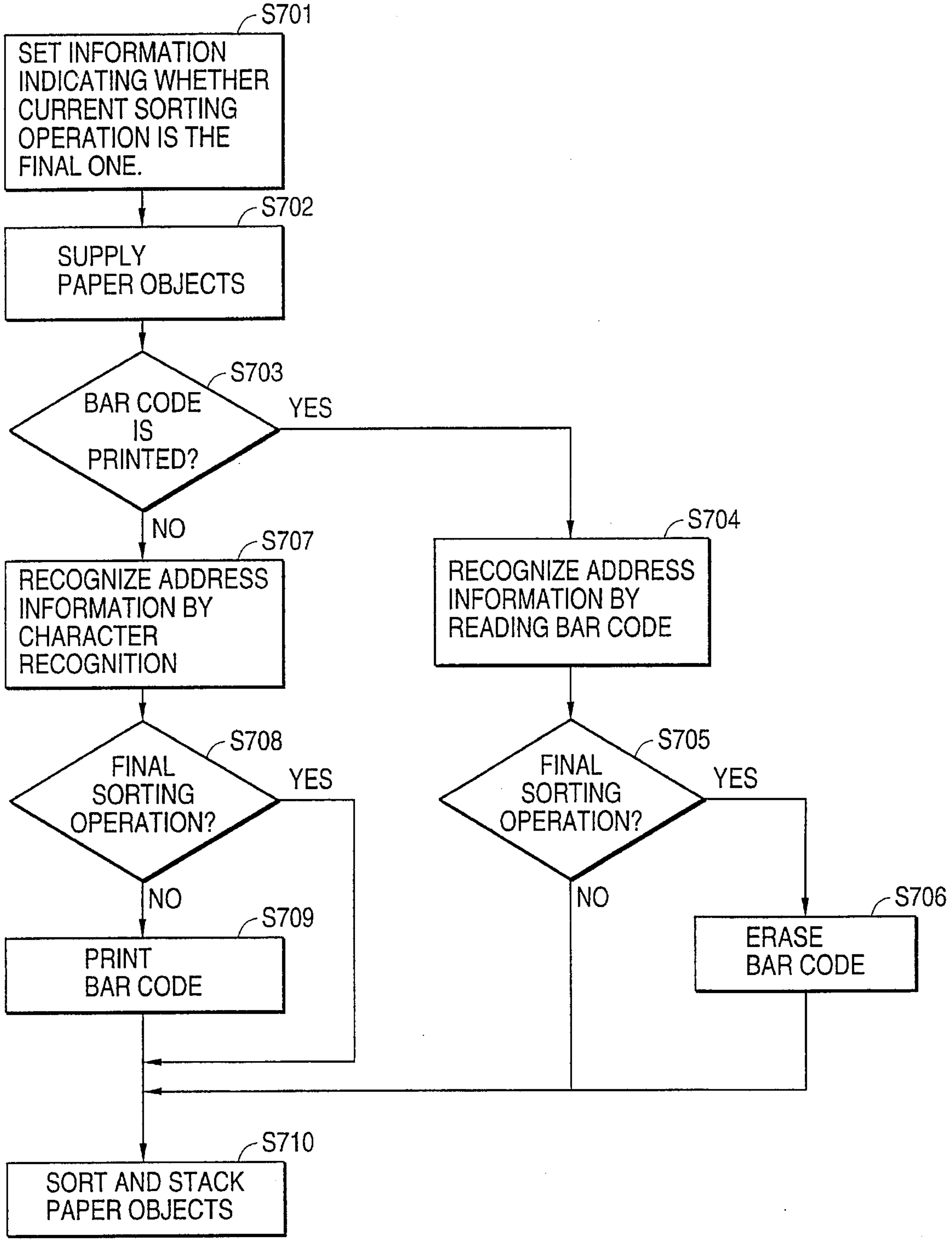
FIG. 7 is a flowchart showing a procedure of a paper object sorting method according to the second embodiment.

Next, a paper objects sorting method using the paper object sorting apparatus of the second embodiment will be described with reference to FIGS. 6 and 7.

First, information indicating whether or not the current sorting operation is the final one is preset in the control section 601 (S701). Then, a plurality of the paper objects 108 to be sorted are set in the paper object supply section 101. The paper objects 108 set in the paper object supply section 101 may be either ones on which bar codes are printed or ones on which bar codes are not printed. In addition, the two types of paper objects 108 may be set in the paper object supply section 101 even in a mixed manner. Then, the paper objects 108 set in the paper object supply section 101 are fed to the conveying path 109 one by one (S702). The bar code reader 104 judges whether a bar code is printed on the paper objects 108 being transported (S703).

If a bar code is printed on the paper objects 108, the bar code reader 104 reads the bar code, and recognizes address information corresponding to the bar code (S704). Then, the control section 601 judges whether or not current sorting operation is the final one (S705). If it is judged that the current sorting operation is not the final one, the paper objects 108 are sorted-and-stacked in accordance with the address information as recognized by the bar code reader 104 (S710). In this case, since the paper objects 108 sorted-and-stacked in the store 107 will be again subjected to a sorting operation, the bar code is left printed. If it is judged that the current sorting operation is the final one, the bar code erasing section 202 erases the bar code on the paper objects 108 (S706). Then, the paper objects 108 are sorted-and-stacked in the store 107 in accordance with the address information as recognized by the bar code reader 104 (S710). In this case, no bar code remain on the paper objects 108 sorted-and-stacked in the store 107.

If it is judged in S703 that no bar code is printed on the paper objects 108, the optical character reader 102 recognizes characters written on the paper objects 108 to thereby recognize address information (S707). Then, the control section 601 judges whether or not the current sorting operation is the final one (S708). If it is judged that the current sorting operation is the final one, the paper objects 108 are sorted-and-stacked in accordance with the address information recognized by the optical character recognizing section 102 (S710). In this case, no bar code is printed on the paper objects 108 sorted-and-stacked in the store 107. When the control section 601 has judged that the current sorting operation is not the final one, the bar code printing section 503 prints a bar code on the paper objects 108 (S709). Then, the paper objects 108 are sorted-and-stacked in the store 107 in accordance with the address information recognized by the optical character recognizing section 102 (S710). In this case, the bar code is printed on the paper objects 108 sorted-and-stacked in the store 107.

In S705 and S708, the control section 601 judges whether or not the current sorting operation is the final one. In these steps, the same judging operation is performed on all the paper objects 108 set in the paper object supply section 101; that is, no different judging operations are performed on the respective paper objects fed from the paper object supply section 101. For example, where the paper objects 108 are to be distributed to users after the current sorting operation, it is preset that the current sorting operation is the final one. Therefore, in the case of the final sorting operation, no bar codes are printed on the paper objects 108 sorted-and-stacked in the stores 107. Where the current sorting operation is not the final one, the bar codes are printed on all the paper objects 108 sorted-and-stacked in the stores 107.

Next, referring to FIGS. 8–14, a description will be made of specific structures of the bar code printing section 501 and the bar code erasing section 202 in the above embodiments.

Figure 9:
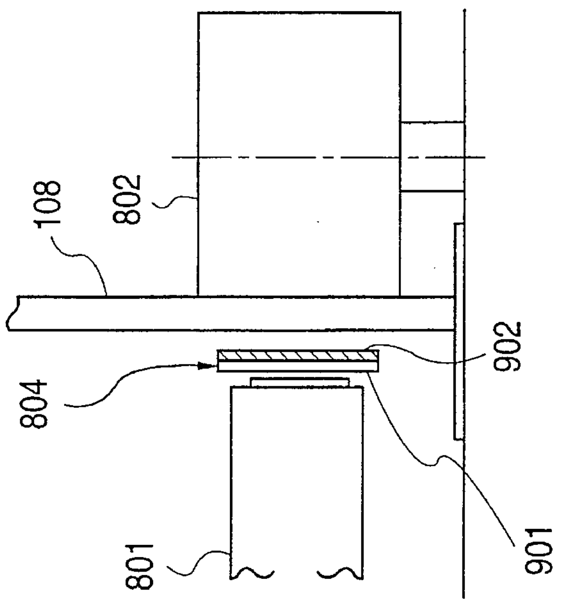
FIG. 9 is a sectional view taken along line X—X in FIG. 8.
Figure 8:
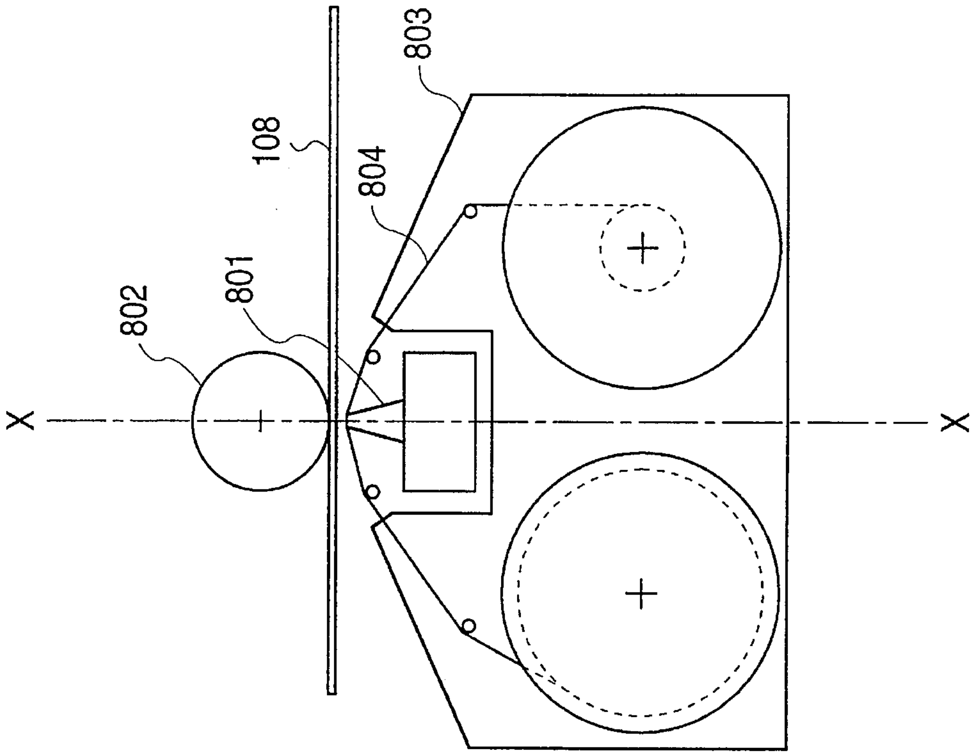
FIG. 8 is a sectional view showing a general structure of an embodiment of a bar code printing section.

As shown in FIG. 8, the bar code printing section 501 has a platen roller 802 for supporting the paper objects 108 being transported, and a printer head 801 for hitting, through a ribbon tape 804, the portion of the paper objects 108 being supported by the platen roller 802. The ribbon tape 802 is accommodated in a ribbon cartridge 803, and is shifted by two rollers every time it is used. As shown in FIG. 9, the ribbon tape 804 has a double structure in which a base portion 901 is provided on the side of the printer head 801 and ink 902 having weak viscosity is provided on the side of the paper objects 108.

The ink 902 is transferred to the paper objects 108 by hitting the base portion 901 of the ribbon tape 804 by the printer head 801 in the same manner as in lettering. The bar code printing method, the control timing of the printer head 801, etc. are not described here in detail, because known means can be used therefor.

Figure 11:
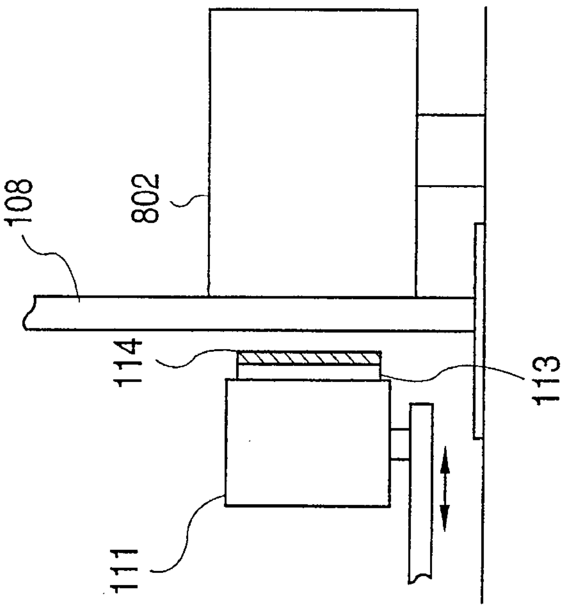
FIG. 11 is a sectional view taken along line Y—Y in FIG. 10.
Figure 10:
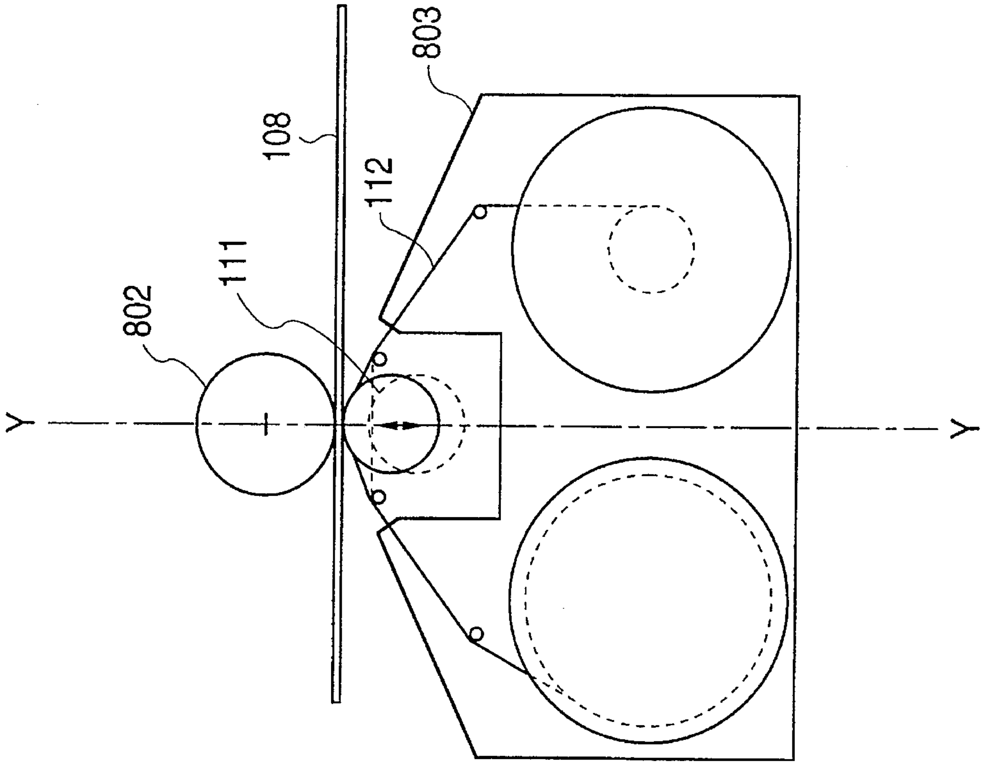
FIG. 10 is a sectional view showing a general structure of a bar code erasing section for erasing bar codes that are printed by the bar code printing section shown in FIG. 8.

Referring to FIGS. 10 and 11, a description will be made on the bar code erasing section 202 for erasing bar codes printed on paper objects 108.

As shown in FIG. 10, the bar code erasing section 202 has a platen roller 802 for supporting the paper objects 108 being transported, and a pusher roller 111 for pushing, through a ribbon tape 112, the portion of the paper objects 108 supported by the platen roller 802. The ribbon tape 112 is accommodated in a ribbon cartridge 803, and is shifted by two rollers every time it is used. The ribbon tape 112 has a duplexed structure in which a base portion 113 is provided on the side of the pusher roller 111 and a substance 114 having strong viscosity is provided on the side of the paper objects 108.

The pusher roller 111 is driven when the paper objects 108 are transported to the position where the bar code printed portion on the paper objects 108 is supported by the platen roller 802. A base portion 113 of the ribbon tape 112 is suppressed by the pusher roller 111 to push the portion having strong viscosity of the ribbon tape 112 against the bar code printed portion. Since the bar code is printed with the weak viscosity ink 902, the ink 902 is stripped off by the strong viscosity substance 114. In this manner, the bar code on the paper objects 108 can be erased.

Next, referring to FIG. 12, other specific embodiments of the bar code printing section 501 and the bar code erasing section 202 will be described.

Figure 12:
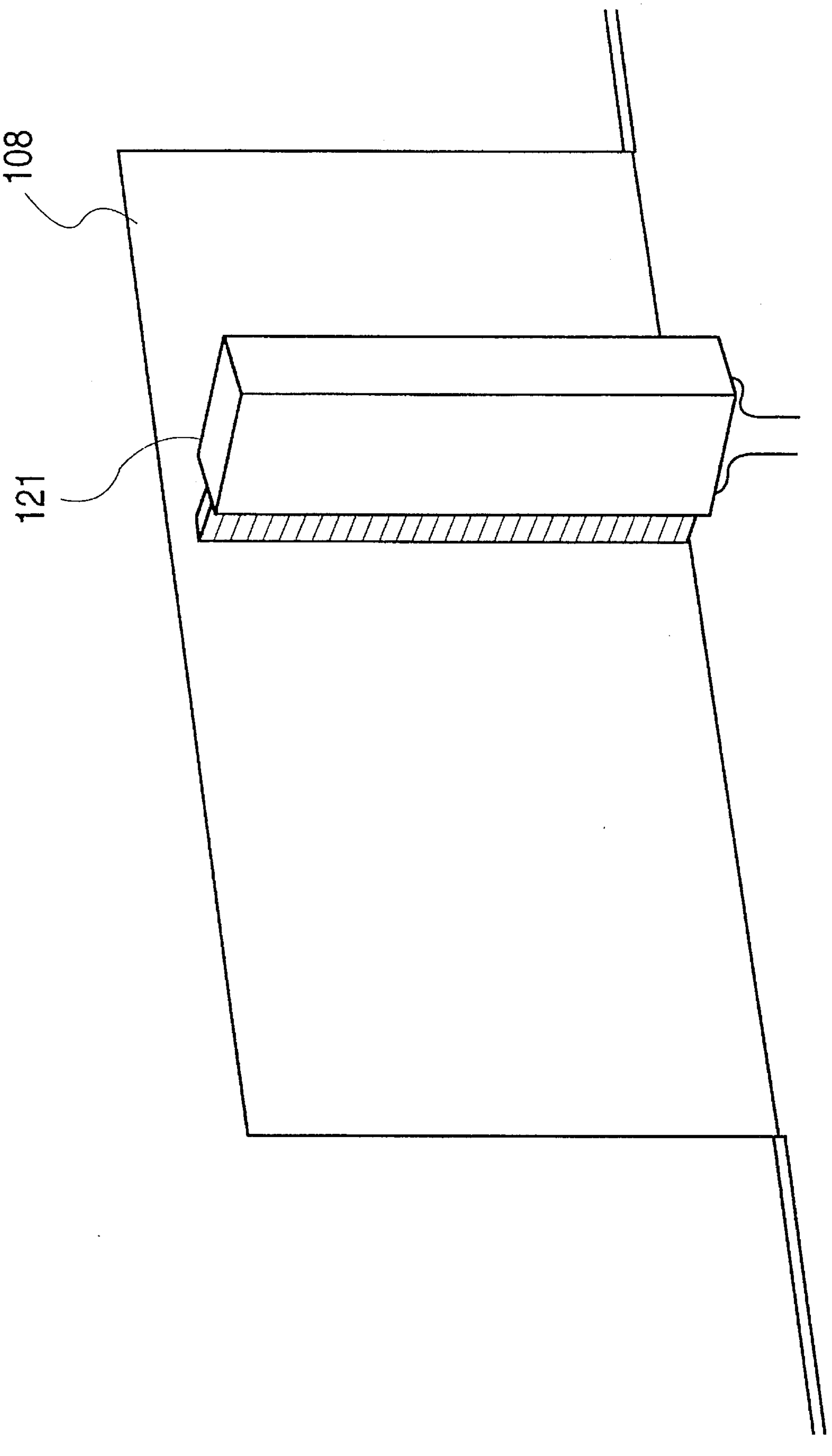
FIG. 12 is a perspective view showing a general structure of a bar code printing section or a general structure of a bar code erasing section according to another embodiment.

As shown in FIG. 12, the bar code printing section 501 has an ink jetting means 121. A bar code is printed by spraying ink as used in a fountain pen etc. from the jetting means 121. The ink can be erased by reacting with a chlorine-based solution.

The bar code erasing section 202 also has an ink jetting means 121 as shown in FIG. 12. A bar code is erased by spraying a chlorine-based solution called an ink eraser from the jetting means 121 onto the bar code printed portion on the paper objects 108.

An ink jet type jetting means or a bubble jet type jetting means may be used in the jetting means 121.

Moreover, although in the bar code erasing section 202 of the above embodiment the chlorine-based solution is sprayed from the jetting means 121 to the paper objects 108, the invention is not limited to this embodiment. For example, there may be employed a means which applies a chlorine-based ink onto the bar codes printed portion on the paper objects 108.

Next, referring to FIGS. 12–14, other specific embodiments of the bar code printing section 501 and the bar code erasing section 202 will be described.

As shown in FIG. 12, the bar code printing section 501 has an ink jetting means 121. Also in this case, a bubble jet type jetting means or an ink jet type jetting means may be used in the jetting means 121. The bar code printing section 501 of this embodiment uses such an ink that reflects light in the visible wavelength range (i.e., visible to human eyes), emits light when excited by illumination of ultraviolet light, and can be erased by applying heat. A bar code is printed on the paper objects 108 by spraying the ink having such characteristics from the jetting means 121.

Figure 14:
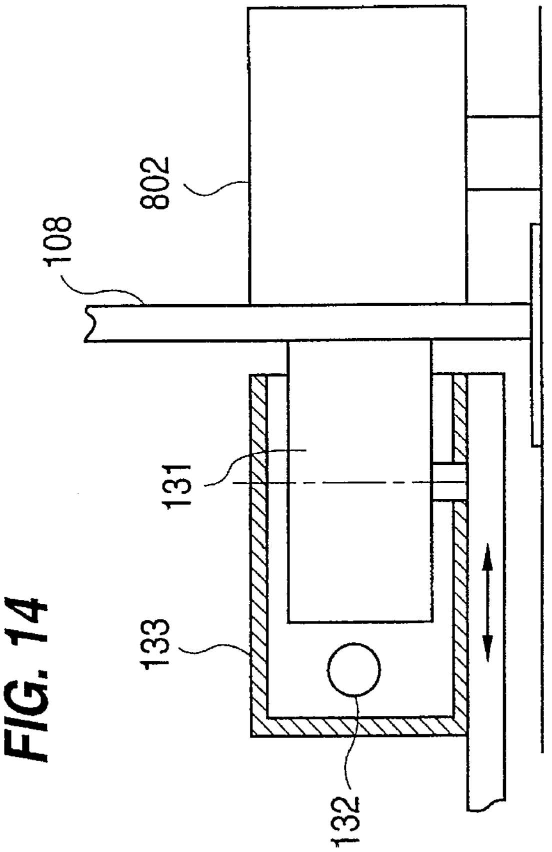
FIG. 14 is a sectional view taken along line Z—Z in FIG. 13.
Figure 13:
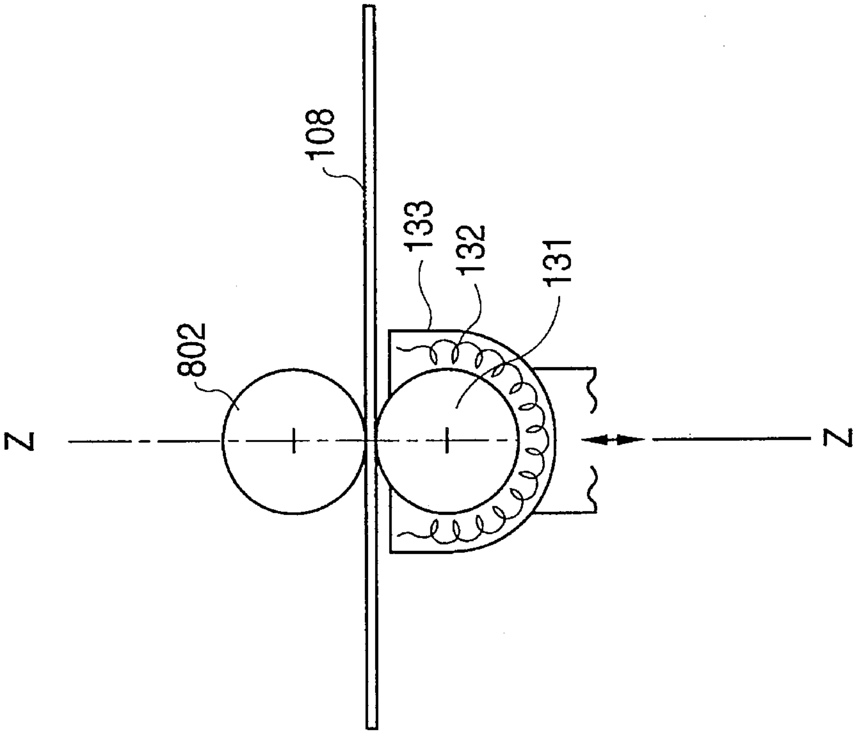
FIG. 13 is a sectional view showing a general structure of a bar code erasing section according to still another embodiment.

As shown in FIGS. 13 and 14, the bar code erasing section 202 for erasing the bar code that has been printed in the above manner has a platen roller 802 for supporting the paper objects 108 being transported, and a heater roller 131 whose temperature is kept at a prescribed temperature by a heater 132 that is accommodated in a heat insulating case 133. While passing between the heater roller 131 and the platen roller 802, the paper objects 108 are heated by the heater roller 131. Heated in the above manner, the bar codes printed on the paper objects 108 are erased.

The above bar code printing section 501 and bar code erasing section 202 can be used in each of the first and second embodiments described above.

It is apparent that the scope of the invention is not limited to the above-described embodiments, but encompasses the scope technically equivalent thereto.

What is claimed is:

1. A paper object sorting apparatus comprising:
   a paper object supply section for supplying, one by one, a plurality of paper objects on each of which a code corresponding to information added to the paper objects to be used for sorting the paper objects is applied;
   a code reader for reading the code applied on the respective paper objects supplied from the paper object supply section;
   a sorting section for sorting the paper objects based on the information corresponding to the code read by the code reader;
   a code erasing section for erasing the code applied on the respective paper objects before the sorted paper objects are stacked for delivery; and
   stackers for stacking the paper objects whose codes have been erased by the code erasing section and which were sorted by the sorting section.

2. The paper object sorting apparatus according to claim 1, wherein the codes are applied on the paper objects with first ink, and wherein the code erasing section comprises means for stripping off the first ink by pushing a viscosity substance against a code applied portion on the paper objects.

3. The paper object sorting apparatus according to claim 2, wherein the code erasing section comprises:
   a platen roller for supporting the paper objects being transported on which the bar code is applied with the first ink; and
   a pusher roller for bringing a first ribbon tape bearing the viscosity substance into contact with a portion of the paper objects supported by the platen roller.

4. The paper object sorting apparatus according to claim 1, wherein the codes are printed on the paper objects with second ink that can be erased by reacting with a chlorine-based solution, and wherein the code erasing section comprises means for spraying the chlorine-based solution onto a code applied portion on the paper objects.

5. The paper object sorting apparatus according to claim 4, wherein the code erasing section comprises ink jet type jetting means.

6. The paper object sorting apparatus according to claim 4, wherein the code erasing section comprises bubble jet type jetting means.

7. The paper object sorting apparatus according to claim 4, wherein the second ink is one that can be used in a fountain pen.

8. The paper object sorting apparatus according to claim 1, further comprising:
   means for determining that a current sorting operation is a final sorting operation during which the paper objects stacked by the stackers are delivered without a subsequent sorting operation;
   wherein the code erasing section erases the codes applied on the respective paper objects before the sorted paper objects are stacked for delivery when the means for determining determines that the final sorting operation is being performed.

9. The paper object sorting apparatus according to claim 1, further comprising:

means for determining a code applied position on the paper object when the code is read by the code reader;

means for detecting a part of the paper object transported after the code applied on the paper object is read by the code reader and storing a detection timing associated with detecting the part of the paper object; and means for controlling an operation timing of the code erasing section according to the code printed position and the detection timing.

10. A paper object sorting apparatus comprising;

a paper object supply section for supplying, one by one, a plurality of paper objects on each of which a code corresponding to information added to the paper objects to be used for sorting the paper objects is applied;

a code reader for reading the codes applied on the respective paper objects supplied from the paper object supply section;

a code erasing section for erasing the codes after they have been read by the code reader;

a sorting section for sorting the paper objects based on reading results of the code reader; and stackers for stacking the paper objects sorted by the sorting section, wherein the code erasing section comprises means for applying heat to a code applied portion on the paper objects.

11. The paper object sorting apparatus according to claim 10, wherein the code erasing section comprises:

a platen roller for supporting the paper objects being transported and on which the code is applied; and a pusher roller to be pushed against a portion of the paper objects supported by the platen roller, the pusher roller being kept at a prescribed temperature.

12. The paper object sorting apparatus according to claim 10, wherein the code applied on the paper object reflects light in the visible wavelength range.

13. A paper object sorting apparatus comprising:

a paper object supply section for feeding a plurality of paper objects one by one to a conveying path;

a code reader for detecting codes applied on the respective paper objects fed from the paper object supply section, and for recognizing sorting information of the paper objects by reading the codes;

an optical character recognition section for recognizing the sorting information of the paper objects by performing optical character recognition on a character pattern added to the paper objects when the code reader has not detected any code;

a code applying section for converting the sorting information as recognized by the optical character recognition section to a corresponding code, and for applying the code on the paper objects;

a code erasing section for erasing the codes after they have been read by the code reader;

a sorting section for sorting the paper objects based on the sorting information; and p1 stackers for stacking the paper objects sorted by the sorting section.

14. The paper object sorting apparatus according to claim 13, wherein the code applying section comprises:

a platen roller for supporting the paper objects being transported;

a printer head for hitting a portion of the paper objects supported by the platen roller through a first ribbon tape bearing first ink, and wherein the code erasing section comprises:

a platen roller for supporting the paper objects on which the code is printed with the first ink; and a pusher roller for pushing a second ribbon tape bearing a viscosity substance against a portion of the paper objects supported by the platen roller.

15. The paper object sorting apparatus according to claim 13, wherein the code applying section comprises means for spraying second ink that can be erased by a chlorine-based solution onto the paper objects, and wherein the code erasing section comprises means for spraying the chlorine-based solution onto a code printed portion on the paper objects.

16. The paper object sorting apparatus according to claim 15, wherein the second ink is one that can be used in a fountain pen.

17. The paper object sorting apparatus according to claim 13, wherein the code applying section comprises means for spraying third ink can be erased by heating, and wherein the code erasing section comprises means for heating a code applied portion on the paper objects.

18. The paper object sorting apparatus according to claim 17, wherein the third ink is one that reflects light in the visible wavelength range.

19. A paper object sorting-and-stacking method comprising the steps of:

supplying a plurality of paper objects one by one;

recognizing sorting information of the paper objects by reading respective codes applied on the supplied paper objects;

sorting the paper objects based on the sorting information;

erasing the codes applied on the paper objects before the sorted paper objects are stacked for delivery; and stacking the code erased paper objects which have been sorted based on the sorting information.

20. The paper objects sorting-and-stacking method according to claim 19, further comprising, before the second step, a sixth step of recognizing the sorting information added to the paper objects based on image data obtained by scanning the paper objects; and a seventh step of printing bar codes that corresponded to the sorting information added to the paper objects, and the fourth step of sorting paper objects based on the sorting information obtained by scanning the paper objects or reading the bar codes on the paper objects.

21. The paper object sorting-stacking method according to claim 19, further comprising the step of:

determining that a current sorting operation is a final sorting operation during which the paper objects stacked by the stackers are delivered without a subsequent sorting operation, wherein the code erasing step includes the step of erasing the codes applied on the respective paper objects before the sorted paper objects are stacked for delivery when the determining step determines that the final sorting operation is being performed.

22. An object sorting apparatus comprising:

an object supply section for supplying, one by one, a plurality of objects on each of which a code corresponding to sorting information added to the objects is applied;

a code reader for reading the code applied on the respective objects supplied from the object supply section;

a sorting section for sorting the objects based on the information corresponding to the code read by the code reader;

a code erasing section for erasing the code applied on the respective objects before the sorted objects are stacked for delivery; and stackers for stacking the objects whose codes have been erased by the code erasing section and which were sorted by the sorting section.

* * * * *